Figure 1:
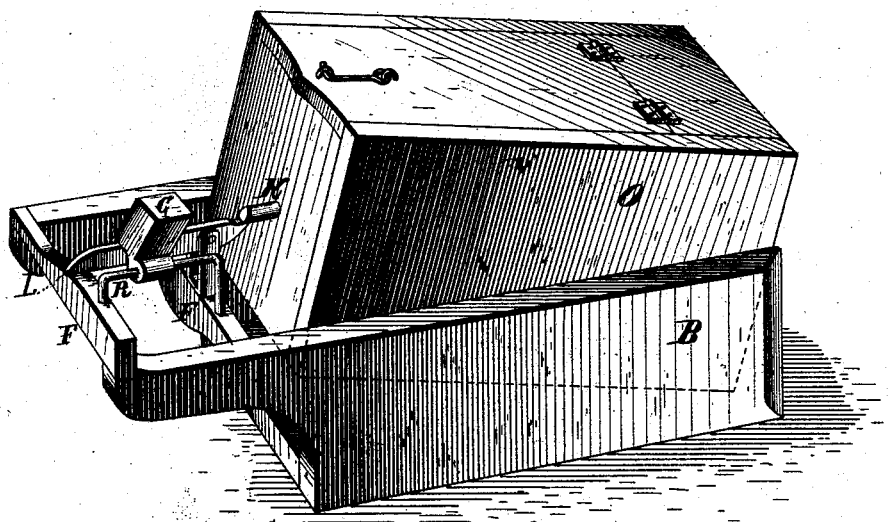
Figure 2:
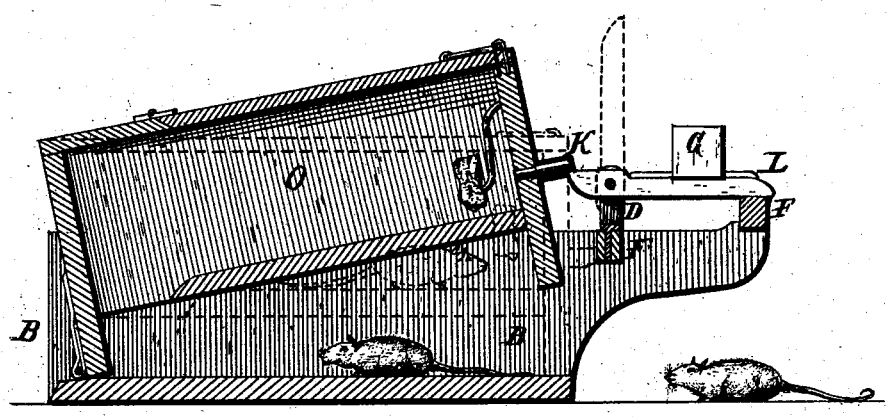

W. B. WIGGINS.
Animal-Trap.

No. 224,498.　　　　Patented Feb. 10, 1880.

Attest:　　　　　　　　　　　　　　Inventor:
J. Henry Kaiser　　　　　　　　William Burton Wiggins
Alex. Scott

UNITED STATES PATENT OFFICE.

WILLIAM B. WIGGINS, OF ROBBINSVILLE, NORTH CAROLINA.

ANIMAL-TRAP.

SPECIFICATION forming part of Letters Patent No. 224,498, dated February 10, 1880.

Application filed July 14, 1879.

*To all whom it may concern:*

Be it known that I, WILLIAM BURTON WIGGINS, of Robbinsville, in the county of Graham and State of North Carolina, have invented a new and useful Trap for Catching Rats, Mice, Fowls, and Animals, of which the following is a specification.

The invention relates to a new and useful improvement in animal-traps.

All other traps heretofore invented, as far as my knowledge extends, have been supplied with triggers, treadles, fall-shutters, &c., which may be lifted or thrown by the strength of any animal that may chance to enter, and with small tapering holes or passage-ways for the purpose of admitting animals, &c., into said traps—all liable to catch, kill, or frighten the first animal, &c., of any kind that may chance to enter them. All these plans are objectionable for the following reasons: First, all traps that are liable to catch, kill, or frighten the first animal, &c., only of any kind that may chance to enter prevent others from entering, &c.; second, such traps as are provided with fall-shutters and small tapering passage-ways may permit animals, &c., to enter while others are in prison, and while those are entering, by lifting fall-door, the ones in prison may pass out; and as all animals, even of the same species, are of vast difference both in size and strength, any passage that would permit the largest size to enter would permit a smaller size to pass out; and, third, inasmuch as it is one of the instincts in the nature of all animals of the same species, as soon as frightened, caught, imprisoned, entrapped, or put in fear of bodily harm, to notify all others of danger, and as self-preservation is one of the first laws of nature, they will as soon as notified flee for safety.

The object of my invention is to provide a system of traps that will allow rats, mice, fowls, and other animals to pass in and out without any suspicion of danger, and by so doing encourage others to enter, so as to catch or imprison a great many or a few only at the same time, as may be desired, which may be easily regulated by lever and weight.

The invention consists in the combination of two boxes, a lever, and a weight, in connection with other parts of mechanism, whereby the two boxes are controlled by the same gearing, so as to open and shut, unite, and assist each other in catching.

Like letters of reference indicate like parts.

The figure is a perspective view of a device embodying my invention.

In carrying out my invention I prepare the outside and largest box, B, with floor and sides, the sides to extend out beyond the bottom or floor at one end, so as to give room for two cross-bars, F, to be fastened upon the top edges of the sides that pass out beyond the floor, and about the middle and upon the top of the inside cross-bar, F, fasten a standard, D. The top of the standard must lean toward the inside box. In the top of standard D fasten lever L near the end, by a rivet or otherwise, so as to permit each end of lever L to be lowered or raised with ease, in order to have the advantage of lever-power against the end of the inside box, O, the lever L to work across the top of the cross-bars F, with short end toward inside box, O. Near the right-hand side of lever L fasten a wire, R, or rod at each end to cross-bars F, and on wire R a weight, G, must be attached by letting the wire pass through the weight near the end. Weight G must slide from one cross-bar to the other, and turn to or from or rest on lever L when the trap is set.

The inside and top box, O, is constructed a size smaller than box B, in order to have room to open and shut with ease upon the floor of the inside box, B, box O to have floor, sides, ends, and lid, the lid to be fastened by hinges or otherwise, so as to open and shut like a chest-lid, which is fastened by a latch or otherwise when desired to be kept closed. The ends are to extend below the floor, so as, when placed inside of box B, to serve as legs for box O and as ends for box B, and in order to complete two rooms, one in each box. The floor in box O, at the end which is to be fastened by hinges or otherwise to box B, must be shorter than the sides, so as to form a door or passage-way from one room to the other, so as to permit anything that may enter the lower room to pass up into the upper room or story.

If desired to catch fowls, a door must be made in each side of box O, a catch, K, to be fastened on the end of box O near the lever L, and so as to rest on the short end of lever L when the trap is set. When the two boxes are complete place box O inside of box B, so that the catch K will rest on the short end of lever L, as before stated. The boxes O and B are fastened together by hinges or otherwise at the back end, where the end of box O rests upon the bottom of box B.

The operation of the device is as follows: When desired to be used bait each room with any suitable bait.

*How to set the trap.*—Raise the end of box O and place the catch K on the short end of lever L, then pull down the long end until it rests on the outside of cross-bar F, and if desired to catch in large numbers, place the weight G on the long end of lever L; but if desired to catch in small numbers, place the weight G near standard D. Animals, &c., will enter the lower box, B, first, and pass on to the back end, through the door, up into the second box, O, and when the desired weight enters the lever L will rise, the weight G turn off, and the trap close and prevent any escape from each room.

What I claim as my invention is—

The combination, with the box B and box O, provided with the catch K, of the lever L, and adjustable weight G, substantially as described.

WILLIAM BURTON WIGGINS.

Witnesses:
R. H. SHERRILL,
N. G. PHILIPS.